United States Patent [19]

Fischer

[11] 4,274,441
[45] Jun. 23, 1981

[54] CONNECTION COUPLING CONNECTABLE UNDER PRESSURE

[75] Inventor: Wolf E. Fischer, Ettlingen, Fed. Rep. of Germany

[73] Assignee: Semperit AG, Vienna, Austria

[21] Appl. No.: 939,863

[22] Filed: Sep. 5, 1978

[30] Foreign Application Priority Data

Sep. 12, 1977 [DE] Fed. Rep. of Germany ....... 2741027

[51] Int. Cl.³ .................... F16L 29/00; F16L 37/28
[52] U.S. Cl. .................... 137/614.05; 251/149.6; 137/614
[58] Field of Search ............ 137/614.06, 614.05, 137/614.01

[56] References Cited

U.S. PATENT DOCUMENTS

| | | | |
|---|---|---|---|
| 2,637,572 | 5/1953 | Bruce | 137/614.02 |
| 2,706,646 | 4/1955 | Olson | 137/614.04 |
| 2,735,696 | 2/1956 | Omon et al. | 137/614.05 |
| 3,236,251 | 2/1966 | Hansen | 137/614.05 |
| 3,348,575 | 10/1967 | Simak | 137/614.05 |
| 3,367,366 | 2/1968 | Oliveau et al. | 137/614.05 |
| 3,791,411 | 2/1974 | Bogeskov et al. | 137/614.02 |
| 4,200,121 | 4/1980 | Walter et al. | 137/614 X |

FOREIGN PATENT DOCUMENTS 2642724  3/1978  Fed. Rep. of Germany.

Primary Examiner—Alan Cohan
Assistant Examiner—A. Michael Chambers
Attorney, Agent, or Firm—Werner W. Kleeman

[57] ABSTRACT

A connection coupling which can be coupled or connected under pressure and employed with hydraulic lines, comprising a non-pressure loaded coupling half and a coupling half under pressure, in each coupling half there is centrally mounted a valve guide. In each valve guide there is axially displaceably arranged a spring-loaded hydraulically impingeable or loadable valve in such a manner that the valve heads, during the coupling operation, are pressed against one another. The non-pressure impinged valve is shifted through twice the possible valve stroke of the pressure impinged valve, and the non-pressure impinged valve is loaded with a spring which is stronger than the spring loading the pressure impinged valve, so that upon pressure equalization the previously pressure impinged valve is pressed in its open position against a stop provided at the previously pressure impinged coupling half, there being provided a maximum valve-passage cross-section for both valves. The free passage cross-section about the valve guide at least of the non-pressure impinged coupling half is clearly greater than that of the valve-passage cross-section.

14 Claims, 5 Drawing Figures

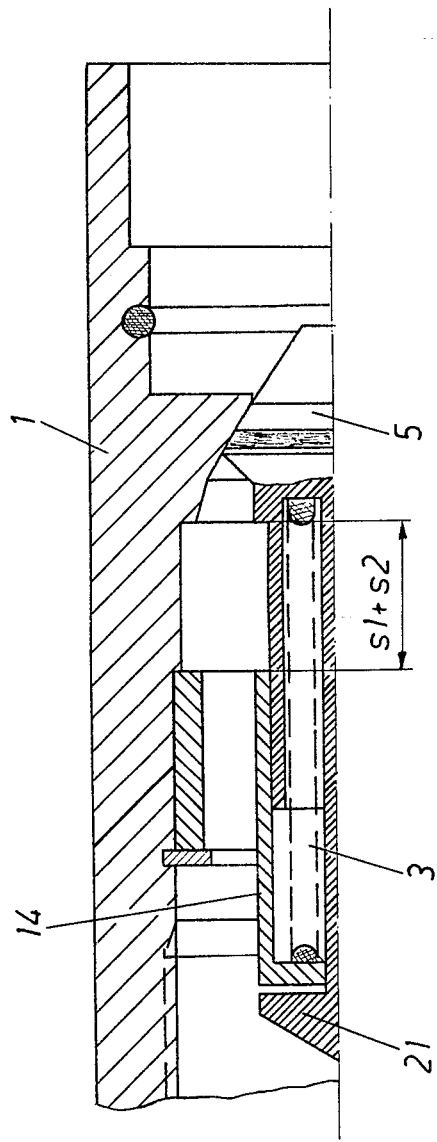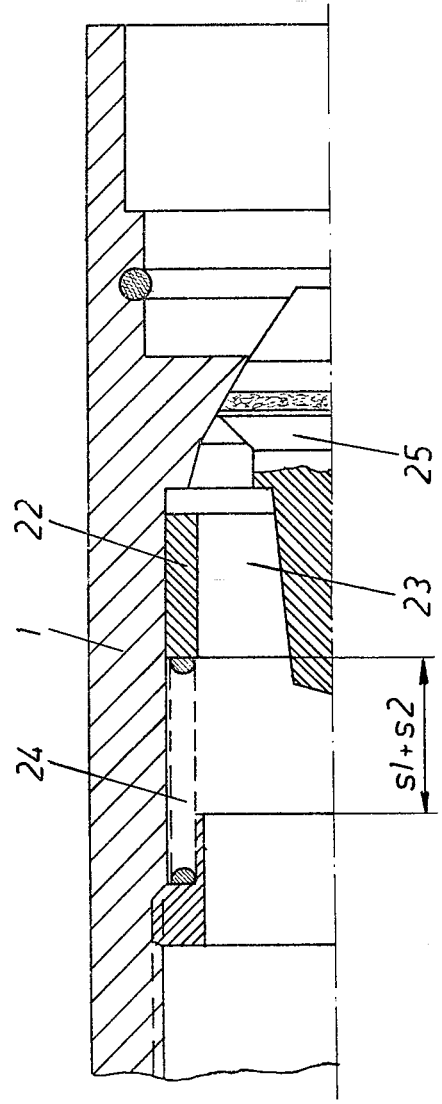

CONNECTION COUPLING CONNECTABLE UNDER PRESSURE

BACKGROUND OF THE INVENTION

The present invention relates to a new and improved construction of connection coupling which can be coupled or connected under pressure and serving for use with hydraulic lines or conduits.

Generally speaking, the connection coupling of the present invention is of the type having a non-pressure loaded coupling half and a coupling half which is under pressure load. A valve guide is centrally arranged in each coupling half. In each valve guide there is axially displaceably arranged a respective spring-loaded, hydraulically impingeable valve in a manner such that the valve heads of such valve, during the coupling operation, are pressed against one another. The non-pressure loaded valve is shifted through twice the possible valve stroke or displacement path of the pressure loaded valve, and the non-pressure loaded valve is loaded with a spring which is stronger than the spring loading the pressure loaded or pressure impinged valve, so that with pressure equalization the previously pressure loaded valve is pressed, in the open position, against a stop provided at the previously pressure loaded coupling half and there results a maximum valve-passage cross-section at both valves.

Connection couplings of this type work completely satisfactorily during normal operation, in other words when the hydraulic fluid always flows in the same direction from the non-pressure loaded coupling half to the pressure loaded coupling half. But already, however, upon occurrence of pronounced pressure fluctuations and pressure surges, causing a reversal of the flow direction, the valve which previously was under pressure can slam shut since the oppositely situated valve is not fixed in its position. Without exception such type connection couplings can not be employed when the direction of flow of the hydraulic fluid or liquid medium, during operation, reverses, under circumstances even in a sudden-like manner, and thus, also the valve is slammed shut. This occurs, for instance, if there are provided double-acting cylinders in hydraulic installations wherein the pressure line and return flow line are identical. An increase of the pressure normally prevailing in such type hydraulic installations additionally can be brought about when the weight at the load-side of the device loads the corresponding piston, such as for instance is the case during lowering of a fully loaded front loader.

Also as part of the state-of-the-art is a connection coupling wherein the free path of the previously non-pressure loaded valve can be limited following the coupling operation, to thereby preclude any return movement or retraction of the valve. Such adjustment of the coupling has, however, been found to be really disadvantageous, firstly because to do so there is required an appropriate tool, and thus, frequently cannot be carried out, or because the adjustment is totally forgotten since the described drawback first is noticeable during operation.

SUMMARY OF THE INVENTION

Hence, with the foregoing in mind it is a primary object of the present invention to provide a new and improved construction of connection coupling which can be connected under pressure and is not associated with the aforementioned drawbacks and limitations of the prior art coupling constructions heretofore discussed.

Another and more specific object of the present invention aims at constructing a connection coupling of the previously described type in a manner such that there can be avoided any unintentional slamming shut of the valves, even with sudden changes in the flow direction of the hydraulic fluid as well as also in the presence of pronounced and abrupt pressure fluctuations in the hydraulic system, also without requiring any disadvantageous adjustments of the coupling.

A further notable object of the present invention is to provide a new and improved construction of connection coupling which is relatively simple in construction and design, extremely reliable in operation, economical to manufacture, not readily subject to breakdown or malfunction, and can positively prevent unintentional valve closure even in the presence of sudden changes in the flow direction of the hydraulic fluid medium as well as upon encountering pronounced and abrupt pressure fluctuations in the hydraulic system.

Now in order to implement these and still further objects of the invention, which will become more readily apparent as the description proceeds, the invention contemplates that the free passage cross-section or cross-sectional area about the valve guide at least at the non-pressure loaded coupling half is clearly greater than that of the valve-passage cross-section.

With such construction of the connection coupling, during the normal flow direction of the hydraulic fluid medium from the previously non-pressure loaded coupling half to the previously pressure loaded coupling half, the valves, firstly, are displaced by the stronger spring pressure of the valve in the previously non-pressure loaded coupling half, and secondly, however, also by the hydraulic forces against the stop in the previously pressure loaded coupling half, and thus, positively held open. Retention of the valves in the open position also however is achieved upon reversal of the flow direction, since according to the principles of flow which are well known such a high pressure builds-up in the clearly larger cross-sectional area or cross-section about the related valve guide, following the relatively narrow valve-passage cross-section, that in conjunction with the stronger spring loading the valve in the previously non-pressure loaded coupling half, there is prevented with certainty any slamming shut of the valve in the previously pressure loaded coupling half. This effect can be further augmented if the valve-passage cross-section over both valves remains essentially constant, so that no pressure changes occur at such path.

In order to positively obtain the strived for pressure build-up it is further proposed, according to the invention, to design the volume of the space or chamber about the valve guide at least of the non-pressure loaded coupling half so as to be clearly larger than that of the space or chamber about both of the valves.

Since both coupling halves are designed as a coupling sleeve and coupling plug, and the coupling plug, since it must be inserted into the coupling sleeve, anyway has dimensions smaller than the coupling sleeve, there is realized an advantageous construction of such connection coupling according to the invention inasmuch as the free passage cross-section about the valve guide of the non-pressure loaded coupling half, in this case the coupling sleeve, is greater than that of the pressure loaded or pressure impinged coupling half, in other words the coupling plug, and such in turn is greater than the valve-passage cross-section and the volume of the space about the valve guide of the non-pressure loaded coupling half (coupling sleeve) is greater than the volume of the space about the valve guide in the pressure loaded coupling half (coupling plug) and such again is greater than the volume of the space about both valves.

Finally, what is also advantageous is the fact that the cross-section of the valve-passage cross-sectional area is suddenly enlarged towards the passage cross-section about the valve guide, since by virtue of these measures there is not only clearly set the desired effect of the pressure build-up, but also the pressure-resistance of the connection coupling is reduced.

The arrangement of the chambers or spaces, as contemplated by the invention, could lead to a non-desired longitudinal travel or displacement of the valves during normal direction of flow of the hydraulic fluid medium, in other words from the previously non-pressure loaded coupling half to the previously pressure loaded coupling half, upon occurrence of pronounced and abrupt pressure fluctuations. This is prevented according to the invention in that the hydraulically impacted surfaces of the previously non-pressure loaded valve, in the closing direction, are larger than those in the opposite direction. By virtue of this feature there is achieved the beneficial result that pressure surges and pressure fluctuations, as the case may be, always only are effective in the closing direction of the previously non-pressure impinged valve. Consequently, both valves, in other words both the previously non-pressure impinged coupling half as well as also the previously pressure impinged coupling half, remain in their open position. Notwithstanding such measures there is not impaired the normal function of the connection coupling, since the closing mechanism and opening mechanism of the valves otherwise remain completely the same.

The larger hydraulically loaded surface can, in a simple case, be formed in that the cross-section of the previously non-pressure loaded valve is greater than that of the previously pressure loaded valve. However, the surface also can be enlarged in that there is connected with the previously non-pressure loaded valve an impact plate disposed perpendicular to the closing direction. This measure is particularly then extremely effective if the previously non-pressure loaded valve is guided by means of its valve stem or shaft in a centrally fixedly arranged valve guide and the impact plate is arranged, in the closing direction of the valve, at a slight spacing from the rear face of this valve guide. Then the impact plate is only impinged in the closing direction of such valve by the flowing medium, whereas in the opposite direction it is covered by the valve guide. This effect is further intensified in that the impact plate, according to the invention, is conically tapered in the closing direction of such valve.

A further possibility resorts to a design wherein the valve guide in the previously pressure impinged coupling half constitutes a centrally fixedly arranged valve guide and that of the previously non-pressure impinged coupling half constitutes a ring piston guided at the inner wall of the coupling housing and rigidly connected with the valve. By virtue of this measure the ring piston acts in addition to the cross-section of the valve as an hydraulic loadable surface, and this surface of the ring piston, together with the struts which connect such with the valve, can be accommodated to the relevant pressure conditions. As a further construction and development of this concept, according to the invention there is additionally proposed connecting the centrally arranged valve guide of the previously non-pressure loaded valve with a ring piston guided at the inner wall of the coupling housing. In this case the deviation movement of the previously non-pressure loaded valve is subdivided, firstly, into the movement of the actual valve, and secondly, into the movement of the valve guide. Advantageously in this case the spring force acting upon the valve is maintained slightly smaller than the spring force acting upon the ring piston, in order to achieve a clear separation between the axial movement operations.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3 illustrates in fragmentary sectional view a valve construction employing an impact plate;

FIG. 4 illustrates in fragmentary sectional view a valve construction using a ring piston.

DETAILED DESCRIPTION OF THE PREFERRED EMBODIMENTS

Figure 1:
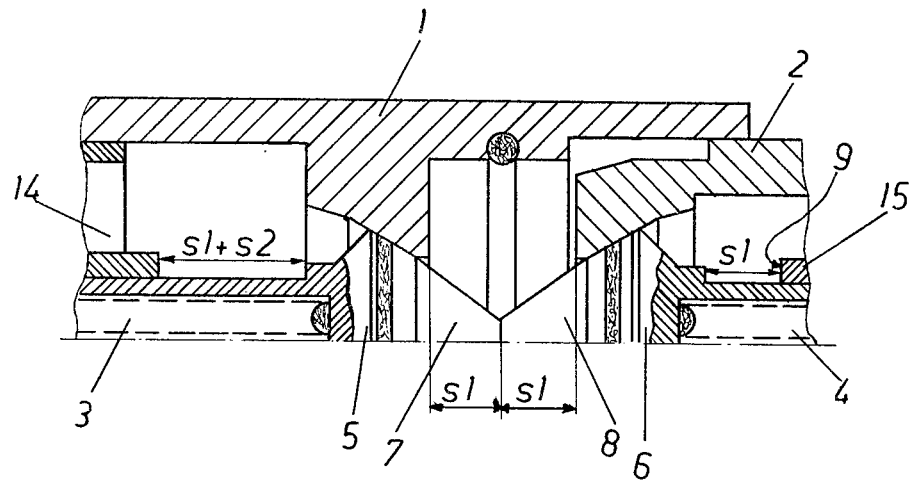
FIG. 1 is a fragmentary sectional view of a connection coupling prior to the coupling operation.
Figure 2:
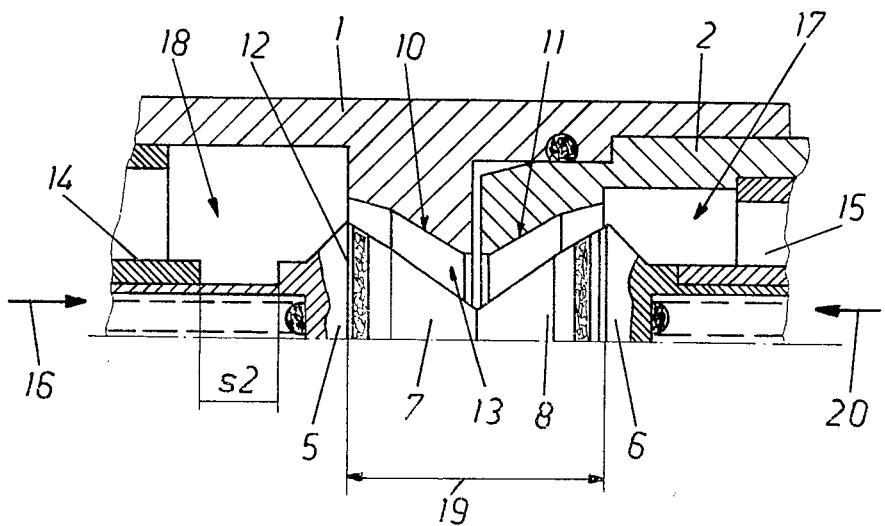
FIG. 2 illustrates the connection coupling of FIG. 1, again in fragmentary sectional view, in its coupled or connected state.

Turning attention now to the drawings, in the housing 1 of a non-pressure loaded (also sometimes referred to as non-pressure impinged) coupling half, in the form of a coupling sleeve, as well as in the housing 2 of a pressure loaded (also sometimes referred to herein as pressure impinged) coupling half, in the form of a coupling plug, there are provided valve guides or guide means 14 and 15 in which there are axially displaceably arranged the valves 5 and 6. These valves 5 and 6 are pressed by means of springs 3 and 4 against their related valve seats 10 and 11, respectively. The spring 3 or other equivalent resilient biasing element of the valve 5 in the non-pressure loaded coupling half, the coupling sleeve, is stronger than the spring 4 in the oppositely situated coupling half, the coupling plug. Upon coupling of the pressureless coupling halves 1 and 2, the valve heads 7 and 8 of the valves 5 and 6 impact against one another, and thus, during the coupling operation each shift through the valve displacement path or valve stroke $s_1$. Thus, there is realized the open position shown in FIG. 2, wherein the valve 6 of the coupling plug 2 is pressed by the action of the more powerful spring 3 of the valve 5 of the coupling sleeve 1 against a stop or impact member 9 formed by the valve guide 15 of the coupling half 2, i.e., the coupling plug. If this coupling plug 2, however, is under pressure, then the valve 6 cannot be axially shifted, so that the valve 5 is displaced through the path $s_1+s_2$ in the coupling sleeve 1. First after pressure equalization the more powerful spring 3 of the valve 5 can become effective and also shift the valve 6, into the open position shown in FIG.

2, against the stop 9 of the valve guide or guide means 15.

The connection coupling is structured such that the free passage cross-section in the space or chamber 18 about the valve guide 14 of the coupling sleeve or coupling half 1 is greater than that of the space or chamber 17 about the valve guide 15 of the other coupling half or coupling plug 2 and such, in turn, again is greater than that of the valve-passage cross-section 13. Also the volume of the respective spaces 18, 17 and the space 13 about the valves 5 and 6 are structured so as to have the corresponding relationship. The valves 5 and 6 together with their valve seats 10 and 11, respectively, are designed such that the valve-passage cross-section 13 remains constant throughout the entire displacement path 19, notwithstanding the increasing diameter of the valves 5 and 6. The valve 5 is stepped in a sharp-edge manner at the side 12 confronting the space or chamber 18 about the valve guide 14 in the coupling sleeve 1, in order to obtain a sudden or abrupt transition from the valve-passage cross-section 13 to the space or chamber 18 about the valve guide 14 of the coupling sleeve 1.

During flow of the hydraulic medium in the direction of the arrow 16 the valve 6 is biased both by the pressure of the spring 3 and also by the pressure of the flowing medium against the stop 9 of the valve guide 15. Consequently, both valves 5 and 6 positively remain in the open position shown in FIG. 2. However, even in the case of a reversal of the direction of flow of the hydraulic medium, indicated by the arrow 20, this position is retained, since then, due to the enlargement of the cross-section of the space or chamber 18, there builds-up an hydraulic pressure which again strives to displace the valves 5 and 6 in the direction of the stop or impact member 9. Since the valve-passage cross-section 13 remains constant owing to the particular shape of the valves 5 and 6 and their valve seats 10 and 11 over the entire displacement path 19, there do not here occur any pressure changes and there are not effective at these valves 5 and 6 any forces which possibly axially shift such valves 5 and 6.

Figure 5:
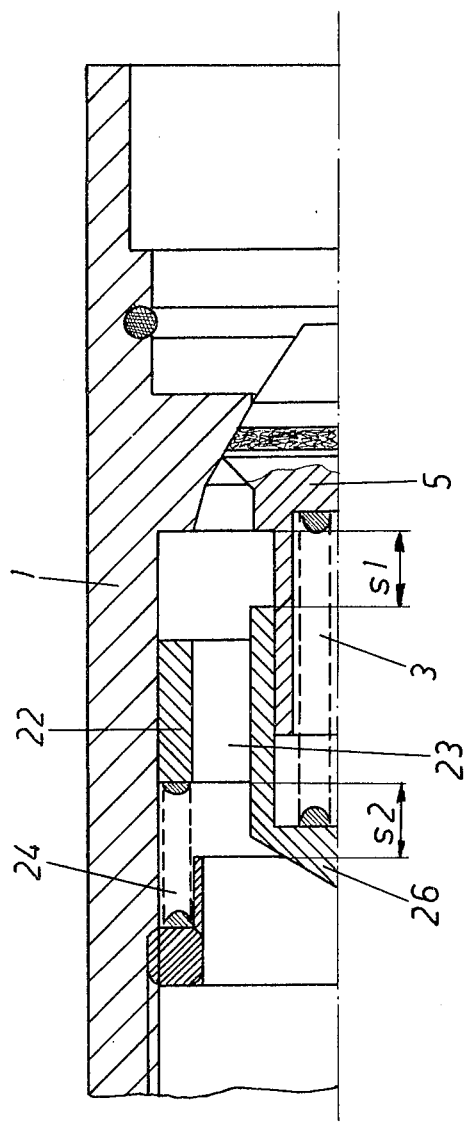
FIG. 5 illustrates in fragmentary sectional view a valve construction using a ring piston at the valve guide.

Continuing, in FIGS. 3, 4 and 5 there are shown different constructions of a valve for the previously non-pressure loaded coupling half. FIG. 3 specifically shows an embodiment wherein the valve 5 is connected with an impact plate 21 arranged behind the valve guide 14. This impact plate or impact member 21, or equivalent structure, is completely impinged in the flow direction 16, while in the opposite direction of flow it is covered by the valve guide 14.

FIG. 4 shows a valve 25 connected by means of struts 23 or equivalent structure with a ring piston 22 guided within housing 1, i.e., the coupling half or coupling sleeve or socket 1, and further, such piston 22 is acted upon by a compression or pressure spring 24. With this arrangement the additional surface is formed by the ring piston 22 together with its struts 23.

Finally, FIG. 5 shows an embodiment wherein a ring piston 22, loaded by a spring 24 or equivalent resilient means, is provided with struts 23, which here however is connected with a valve guide 26 and in which there is slidingly arranged the valve 5 loaded by the spring 3. The closure path of this valve 5 is thus divided into a valve displacement path or stroke $s_1$ and a ring piston stroke or displacement path $s_2$. The hydraulically impingeable or loadable surface, in this case, is formed by the ring piston 22 together with its struts 23 as well also by the valve guide 26.

While there are shown and described present preferred embodiments of the invention, it is to be distinctly understood that the invention is not limited thereto, but may be otherwise variously embodied and practiced within the scope of the following claims. Accordingly,

What I claim is:

1. A connection coupling which can be connected under pressure for use with hydraulic lines, comprising:
   a non-pressure loaded coupling half and a pressure loaded coupling half coacting with one another;
   a respective valve guide substantially centrally arranged in each coupling half;
   a respective spring-loaded, hydraulically loadable valve arranged to be axially displaceable within each valve guide;
   each valve having a valve head;
   said valve heads being pressed against one another during the coupling operation;
   the non-pressure loaded valve being displaced through approximately twice the possible valve stroke of the pressure loaded valve;
   spring means for loading each of said valves;
   said spring means loading the non-pressure loaded valve constituting a stronger spring means than the spring means loading the pressure loaded valve;
   stop means provided for the pressure loaded coupling half;
   said stronger spring means being effective such that during pressure equalization the previously pressure loaded valve is pressed in an open position against said stop means provided in the previously pressure loaded coupling half, thereby forming a maximum valve-passage cross-section at the region of both valves;
   each coupling half having a passage cross-section about the valve guide of the related coupling half; and
   the free passage cross-section about the valve guide at least of the non-pressure loaded coupling half being clearly greater than the free passage cross-section of the valve-passage cross-section.

2. The connection coupling as defined in claim 1, wherein:
   each free passage cross-section about the related valve guide encompasses a respective chamber;
   said valve-passage cross-section encompassing a chamber about both of said valves;
   the volume of the chamber about the valve guide at least of the non-pressure loaded coupling half being clearly greater than the volume of the chamber encompassing said valve passage cross-section about both of the valves.

3. The connection coupling as defined in claim 2, wherein:
   the valve passage cross-section in the non-pressure loaded coupling half, in following the non-pressure loaded valve, enlarges immediately in a step-like fashion to a maximum value, and
   the non-pressure loaded valve itself is shaped at its side confronting said free passage cross-section chamber in a step-like fashion.

4. The connection coupling as defined in claim 2, wherein:
   the volume of the chamber about the valve guide of the non-pressure loaded coupling half being greater than the volume of the chamber about the valve guide of the pressure loaded coupling half and said volume of the last-mentioned chamber being greater than the volume of said chamber encompassing said valve passage cross-section about both of the valves.

5. The connection coupling as defined in claim 1, wherein:
the free passage cross-section about the valve guide of the non-pressure loaded coupling half is greater than the free passage cross-section of the pressure loaded coupling half and said last-mentioned free passage cross-section being greater than said valve-passage cross-section.

6. The connection coupling as defined in claim 1, wherein:
said valve-passage cross-section remains essentially constant over both of the valves.

7. The connection coupling was defined in claim 1, wherein:
the cross-sectional area of the valve-passage cross-section is abruptly enlarged towards the free passage cross-section at least about the valve guide of the non-pressure loaded coupling half.

8. The connection coupling as defined in claim 1, wherein:
the previously non-pressure loaded valve has hydraulically loadable surface means in the closing direction of such valve which are greater than hydraulically loadable surface means of such valve in a direction opposite to said closing direction.

9. The connection coupling as defined in claim 8, wherein:
the cross-section of the previously non-pressure loaded valve about its valve guide is greater than the cross-section of the previously pressure loaded valve about its valve guide.

10. The connection coupling as defined in claim 8, further including:
an impact plate operatively connected with the previously non-pressure loaded valve and disposed essentially perpendicular to a closing direction thereof.

11. The connection coupling as defined in claim 8, wherein:
said valve guide of the previously non-pressure loaded coupling half embodies a ring piston fixedly connected with the valve of said previously non-pressure loaded coupling half;
said previously non-pressure loaded coupling half comprising a coupling housing having an inner wall at which there is guided said ring piston.

12. The connection coupling as defined in claim 11, further including:
means for connecting the ring piston with the related valve; and
said ring piston and said connecting means being structured so as to favor flow in a direction opposite to the closing direction of the previously non-pressure loaded valve.

13. The connection coupling as defined in claim 8, wherein:
the centrally arranged valve guide of the previously non-pressure loaded valve is connected with a ring piston;
said coupling half containing said previously non-pressure loaded valve comprising a coupling housing at which there is guided said ring piston.

14. The connection coupling as defined in claim 13, further including:
means for connecting the ring piston with the related valve; and
said ring piston and said connecting means being structured so as to favor flow in a direction opposite to the closing direction of the previously non-pressure loaded valve.

* * * * *